US012191056B2

(12) United States Patent
Wang et al.

(10) Patent No.: US 12,191,056 B2
(45) Date of Patent: Jan. 7, 2025

(54) BURIED THERMISTOR AND METHOD OF FABRICATING THE SAME

(71) Applicants: HongQiSheng Precision Electronics (QinHuangdao) Co., Ltd., Hebei Province (CN); Avary Holding (Shenzhen) Co., Ltd., Guangdong (CN); Garuda Technology Co., Ltd., New Taipei (TW)

(72) Inventors: Jian Wang, Hebei Province (CN); Jun Dai, Hebei Province (CN); Xiao-Juan Zhang, Hebei Province (CN)

(73) Assignees: HONGQISHENG PRECISION ELECTRONICS (QINHUANGDAO) CO., LTD., Hebei Province (CN); AVARY HOLDING (SHENZHEN) CO., LTD., Shenzhen (CN); GARUDA TECHNOLOGY CO., LTD., New Taipei (TW)

( * ) Notice: Subject to any disclaimer, the term of this patent is extended or adjusted under 35 U.S.C. 154(b) by 367 days.

(21) Appl. No.: 17/852,162

(22) Filed: Jun. 28, 2022

(65) Prior Publication Data

US 2023/0377779 A1 Nov. 23, 2023

(30) Foreign Application Priority Data

May 20, 2022 (CN) ......................... 202210554790.2

(51) Int. Cl.

*H01C 7/00* (2006.01)
*H01C 1/142* (2006.01)
*H01C 17/00* (2006.01)

(52) U.S. Cl.

CPC ............. *H01C 7/008* (2013.01); *H01C 1/142* (2013.01); *H01C 17/006* (2013.01)

(58) Field of Classification Search

CPC ....... H01C 7/008; H01C 17/006; H01C 1/142
See application file for complete search history.

(56) References Cited

U.S. PATENT DOCUMENTS 8,333,506 B2 * 12/2012 Kamenov ............. G01K 7/223 374/185
2015/0182967 A1 7/2015 Coursey et al.
(Continued)

FOREIGN PATENT DOCUMENTS

CN 102573292 B 7/2014
CN 107192470 A * 9/2017 ............... G01K 7/22
(Continued)

OTHER PUBLICATIONS

WO-2007076849 machine translation (Year: 2007).*
CN-107192470 machine translation (Year: 2017).*

*Primary Examiner* — Kyung S Lee
(74) *Attorney, Agent, or Firm* — MUNCY, GEISSLER, OLDS & LOWE, P.C.

(57) ABSTRACT

A buried thermistor includes a lower substrate, an upper substrate, and a number of thermistor stacks. Each thermistor stack includes two resistor subjects. Each resistor subject includes a base layer, a medium layer, a metal layer, a resistor layer, a nanometal layer, and a conductive layer. Applicable material of the resistor layer becomes more diverse by disposing the number of thermistor stacks, and the buried thermistor shows variable thermal sensitivity.

15 Claims, 10 Drawing Sheets

(56) References Cited

U.S. PATENT DOCUMENTS

| | | | | |
|---|---|---|---|---|
| 2015/0211940 | A1* | 7/2015 | Miura | H01C 7/008 429/61 |
| 2018/0122537 | A1* | 5/2018 | Sentoku | H01C 7/008 |
| 2020/0176176 | A1 | 6/2020 | Arai et al. | |
| 2022/0028587 | A1* | 1/2022 | Krotosky | H01C 7/18 |

FOREIGN PATENT DOCUMENTS

| | | | | |
|---|---|---|---|---|
| TW | 200740317 | A | 10/2007 | |
| WO | WO-2007076849 | A1 * | 7/2007 | B32B 18/00 |

* cited by examiner

BURIED THERMISTOR AND METHOD OF FABRICATING THE SAME

CROSS-REFERENCE TO RELATED APPLICATION

This application claims priority to China Application Serial Number 202210554790.2, filed May 20, 2022, which is herein incorporated by reference.

BACKGROUND

Field of Invention

The present invention relates to a resistor component and a method of fabricating the same. More particularly, the present invention relates to a buried thermistor and a method of fabricating the same.

Description of Related Art

In recent years, due to the progression of electronic devices, the properties of multifunctionality, high circuit density, and miniaturization are the main directions of research. A common technical method is that a variety of electronic components are buried into printed circuit boards (PCB). For example, a variety of passive components and active components are buried into the printed circuit boards, thereby decreasing area and weight of the printed circuit boards and increasing reliability of the electronic devices.

SUMMARY

An aspect of the present invention provides a buried thermistor, which includes plural of buried thermistor stacks.

Another aspect of the present invention provides a method of fabricating the buried thermistor.

According to the aspect of the present invention, the buried thermistor is provided. The buried thermistor includes a lower substrate, an upper substrate disposed above the lower substrate, and plural of thermistor stacks disposed between the upper substrate and the lower substrate. Each thermistor stack includes two resistor subjects separated by a through-hole via. Each resistor subject includes a base layer, a medium layer disposed over the base layer, a resistor layer disposed over the medium layer, a metal layer disposed on the resistor layer, a nanometal layer disposed on a portion of the metal layer and a terminal portion of the resistor layer, and a conductive layer, in which the conductive layer covers a portion of an upper surface of the nanometal layer and extending to a sidewall of the nanometal layer and a sidewall of the resistor layer. The metal layer is not disposed on the terminal portion of the resistor layer. The terminal portions of the resistor layers of the two resistor subjects surround the through-hole via.

According to an embodiment of the present invention, the upper substrate and the lower substrate include a substrate layer, a metal base layer and a cover film, respectively.

According to an embodiment of the present invention, the cover film of the lower substrate has at least an opening.

According to an embodiment of the present invention, the conductive layer extends to a portion of a sidewall of the medium layer.

According to an embodiment of the present invention, the buried thermistor further includes plural of adhesive layer disposed between the upper substrate, the lower substrate and the plural of thermistor stacks.

According to an embodiment of the present invention, the metal layer of one of the resistor subjects of at least one of the plurality of thermistor stacks includes a recess, and the recess is adjacent to the nanometal layer.

According to an embodiment of the present invention, the buried thermistor further includes plural of through-hole metal connected the plural of thermistor stacks and the lower substrate.

According to an embodiment of the present invention, the through-hole vias of at least two of the plurality of thermistor stacks have different widths.

According to an embodiment of the present invention, the through-hole vias of at least two of the plurality of thermistor stacks have the same widths.

According to an embodiment of the present invention, the base layer has a gap, and the gap is located directly below the nanometal layer, but not completely below the conductive layer.

According to the aspect of the present invention, the method of fabricating a buried thermistor, which includes fabricating plural of thermistor stacks, is provided. Fabricating the plural of thermistor stacks includes forming a stack layer, in which the stack layer includes a medium layer, a resistor layer and a metal layer, and the metal layer includes a recess; coating a nanometal layer within the recess and on a portion of the metal layer surrounding the recess; forming a through-hole via in the nanometal layer, in which the through-hole via extends through the nanometal layer and the stack layer, thereby separating the nanometal layer and the stack layer into a first portion and a second portion; depositing two conductive layer, respectively, on a portion of a top surface of the nanometal layer of the first portion and the second portion, and extending on a sidewall of the first portion and a side wall of the second portion, respectively; and laminating a base layer on bottom of the first portion and the second portion, respectively. The method of fabricating the buried thermistor further includes fabricating an upper substrate and a lower substrate; and binding the upper substrate, the plurality of thermistor stacks and the lower substrate, in which the plurality of thermistor stacks are located between the upper substrate and the lower substrate.

According to an embodiment of the present invention, forming the stack layer includes forming the stack layer; forming a metal layer over the resistor layer; and forming the recess in the metal layer.

According to an embodiment of the present invention, forming the stack layer further includes forming a laminating layer under the medium layer. After depositing the two conductive layers, respectively, the laminating layer is removed.

According to an embodiment of the present invention, after laminating the base layer, the method further includes forming a gap within the base layer, and the gap is located directly below the nanometal layer.

According to an embodiment of the present invention, the method further includes forming an upper cover film on the upper substrate; and forming a lower cover film on the lower substrate, in which a bottom of the lower cover film includes two openings, and the two openings expose the lower substrate.

With an application of the buried thermistor and method of fabricating the same, selection of material of the resistor layer becomes more diverse and area of resistor region is decreased by disposition of plural of thermistor stacks, and thermal sensitivity is variable.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
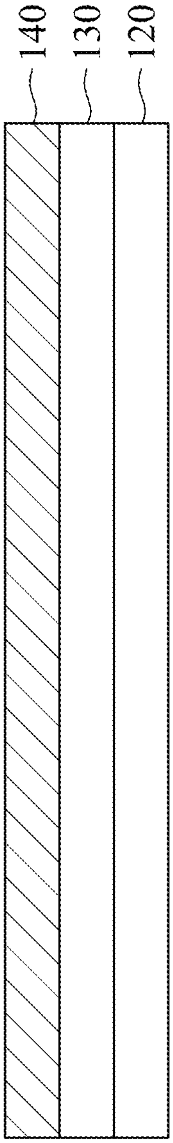
FIGS. 1A-1H illustrate cross-sectional views of intermediate stages in a method of fabricating a thermistor stack according to some embodiments of the present invention.
Figure 1B:
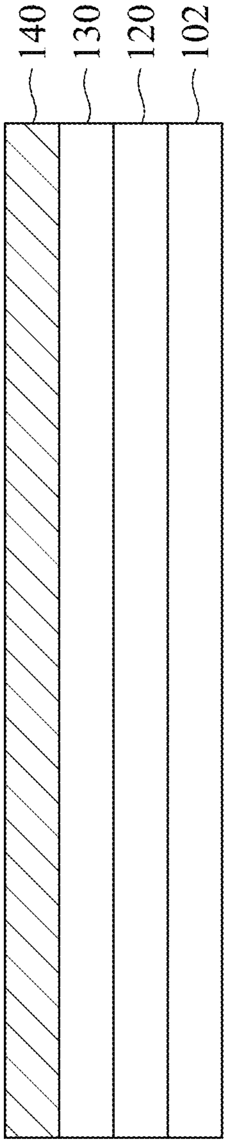
Figure 1C:
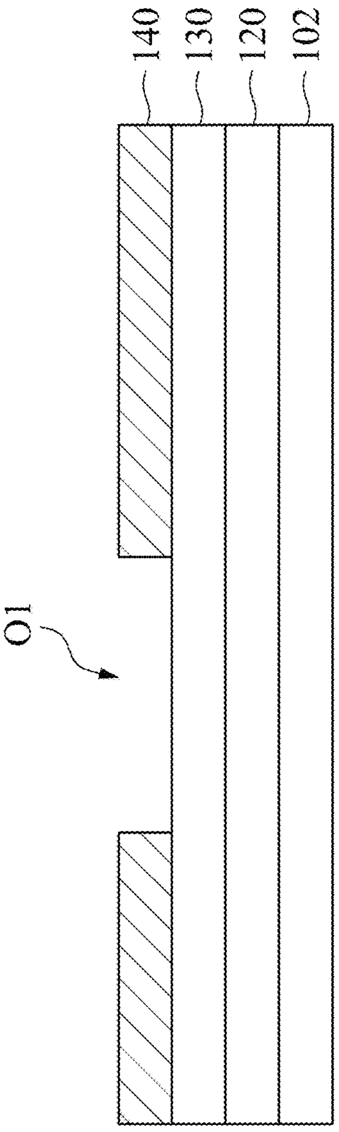

The present invention provides many different embodiments, or examples, for implementing different features of the provided subject matter. Specific examples of components and arrangements are described below to simplify the present invention. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, “around,” “about,” “approximately,” or “substantially” shall generally mean within 20 percent, or within 10 percent, or within 5 percent of a given value or range.

A buried thermistor refers to a buried resistor that is buried in circuit board and shows different resistance according to ambient temperature variation. Generally, material of resistor layers of the buried thermistor should have greater temperature coefficient of resistance (TOR); thus resistance variation may be greater when the temperature changes. For example, conventional resistor material of the buried thermistor has TCR greater than 3000 ppm/° C.

However, only a few pure metals can have desired TCR, such as nickel (Ni), such that material of conventional buried resistor can only be nickel. Since nickel has a resistivity of only 6.9 μΩ·cm, when thickness of the resistor material is fixed, high resistance can be achieved only with greater area or greater length while manufacturing the buried thermistor with higher resistance, but it is disadvantage to apply in electronic product with high circuit density. Therefore, a buried thermistor and a method of fabricating the same are provided in the present invention, selectional restriction to the resistor material of the buried thermistor is decreased by a substrate with high coefficient of thermal expansion (CTE) and difference disposition of thermistor stacks, thereby area of the resistor region cab be decreased.

Reference is made to FIG. 1A to FIG. 1H, which illustrate cross-sectional views of intermediate stages in a method of fabricating a thermistor stack 100 according to some embodiments of the present invention. First, referring to FIG. 1A, a stack layer is formed, in which the stack layer includes a medium layer 120, a resistor layer 130 and a metal layer 140. Next, referring to FIG. 1B, a laminating layer 102 is laminated under the medium layer 120. In some embodiments, the laminating layer 102 includes polyethylene terephthalate (PET). Then, as shown in FIG. 10, the metal layer 140 is etched to form a recess O1, thus exposing the resistor layer 130. During etching the metal layer, a photoresist after exposure may be used to partially cover the metal layer initially, in which a portion of the metal layer exposed by the photoresist is etched out, thereby forming the recess O1. In some embodiments, the recess O1 is formed by using basic etchant to etch the metal layer 140.

Figure 1D:
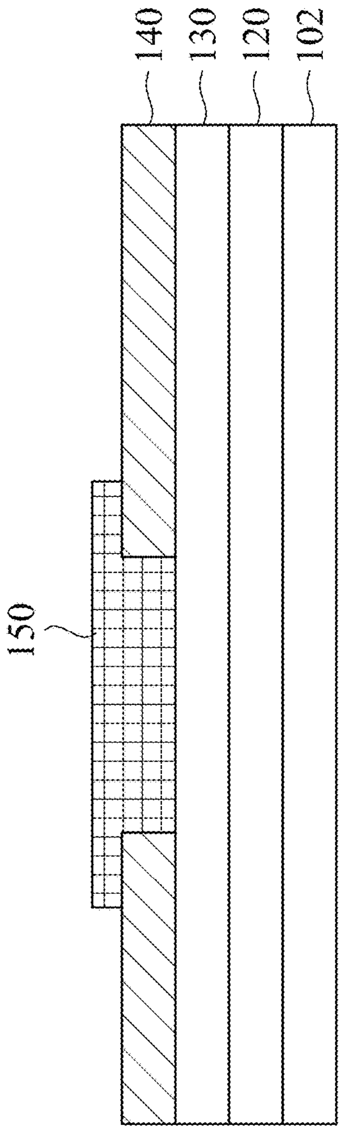
Figure 1E:
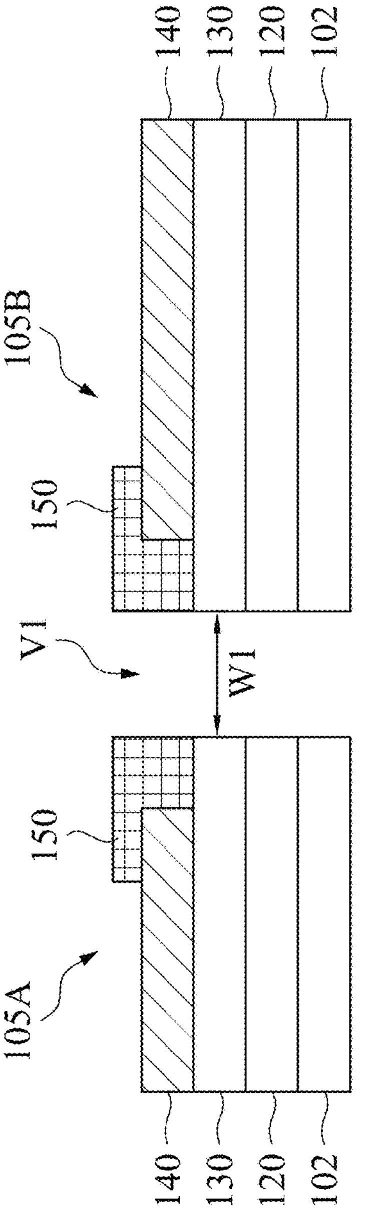

Referring to FIG. 1D, a nanometal layer 150 is coated within the recess O1 and on a portion of the metal layer 140 surrounding the recess O1. Then, as shown in FIG. 1E, a through-hole via V1 is formed in the nanometal layer 150, and through-hole via V1 extends through the nanometal layer 150, the resistor layer 130, the medium layer 120 and the laminating layer 102, thereby separating the stack layer and the nanometal layer 150 into a first portion 105A and a second portion 105B. The through-via hole V1 may be formed as having different widths according to requirement. In some embodiments, the through-hole via V1 may be formed by using laser processing.

Figure 1F:
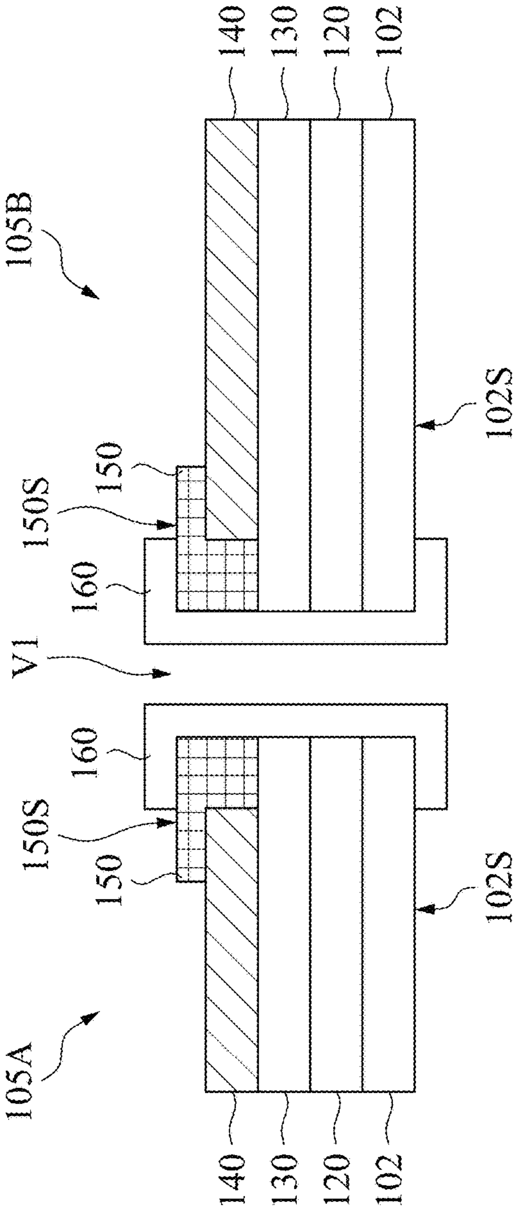

Referring to FIG. 1F, conductive layers 160 are deposited respectively on a portion of a top surface 150S of the nanometal layer 150 of the first portion 105A and the second portion 105B, and the conductive layers 160 are extended to cover sidewalls of the nanometal layer 150 and the stack layers (including the resistor layer 130, the medium layer 120 and the laminating layer 102). In some embodiments, the conductive layers 160 may be deposited by using electroplating, physical vapor deposition (PVD), chemical vapor deposition (CVD) or other suitable processes.

Figure 1G:
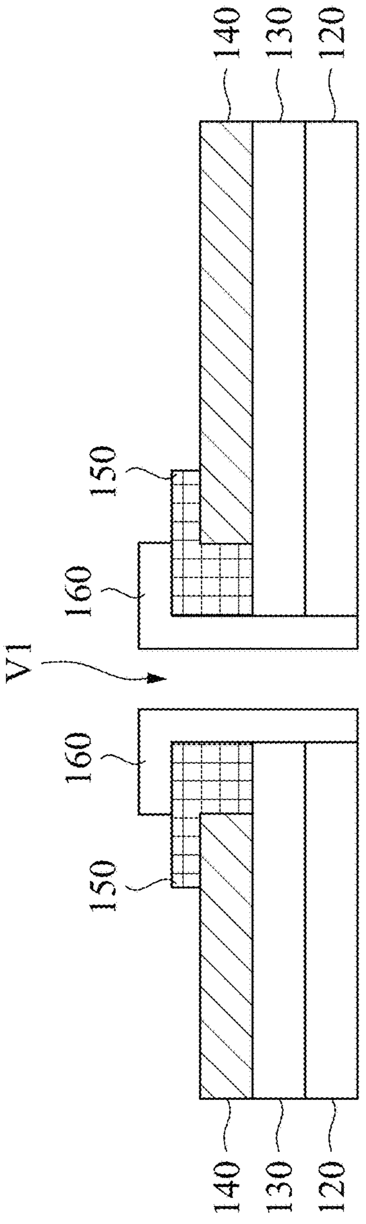
Figure 1H:
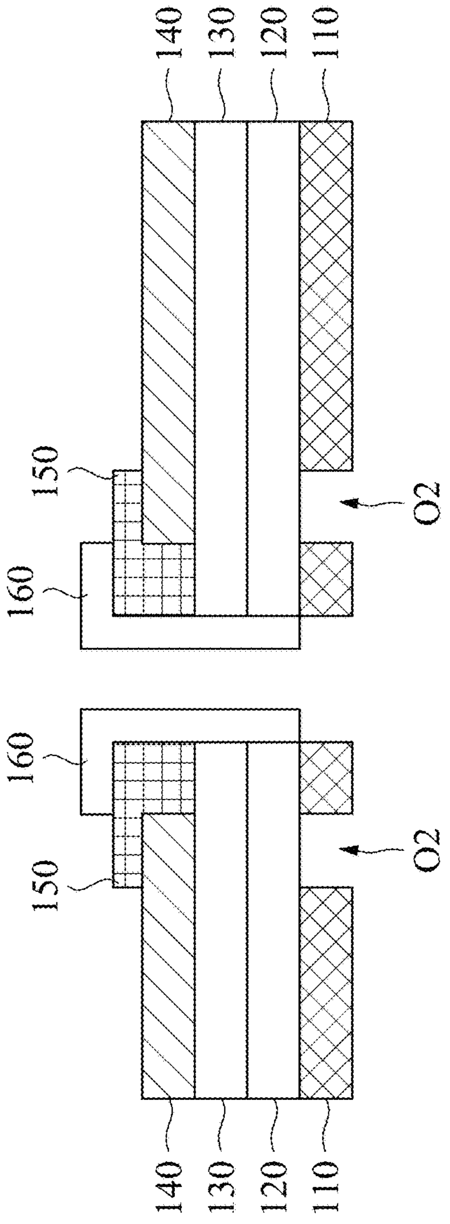

Subsequently, referring to FIG. 1G, the laminating layer 102 is removed, and part of the conductive layer 160 may be removed jointly. The remaining conductive layer 160 should at least extends to the sidewall of the resistor layer 130, and extends to the sidewall of the medium layer 120 is preferable. Then, as shown in FIG. 1H, base layers 110 are laminated on the bottom of the first portion 105A and the second portion 105B (i.e. bottom of the medium layer 120), respectively. In some embodiments, after forming the base layer 110 fully covers the bottom of the medium layer 120, gaps O2 is formed by photolithography and etching the base layer 110. In other embodiments, before laminating the base layer 110 on the bottom of the first portion 105A and the second portion 1056, the base layer 110 can have at least two openings; and after laminating the base layer 110 on the bottom of the first portion 105A and the second portion 1056, such openings become the gaps O2.

Figure 2A:
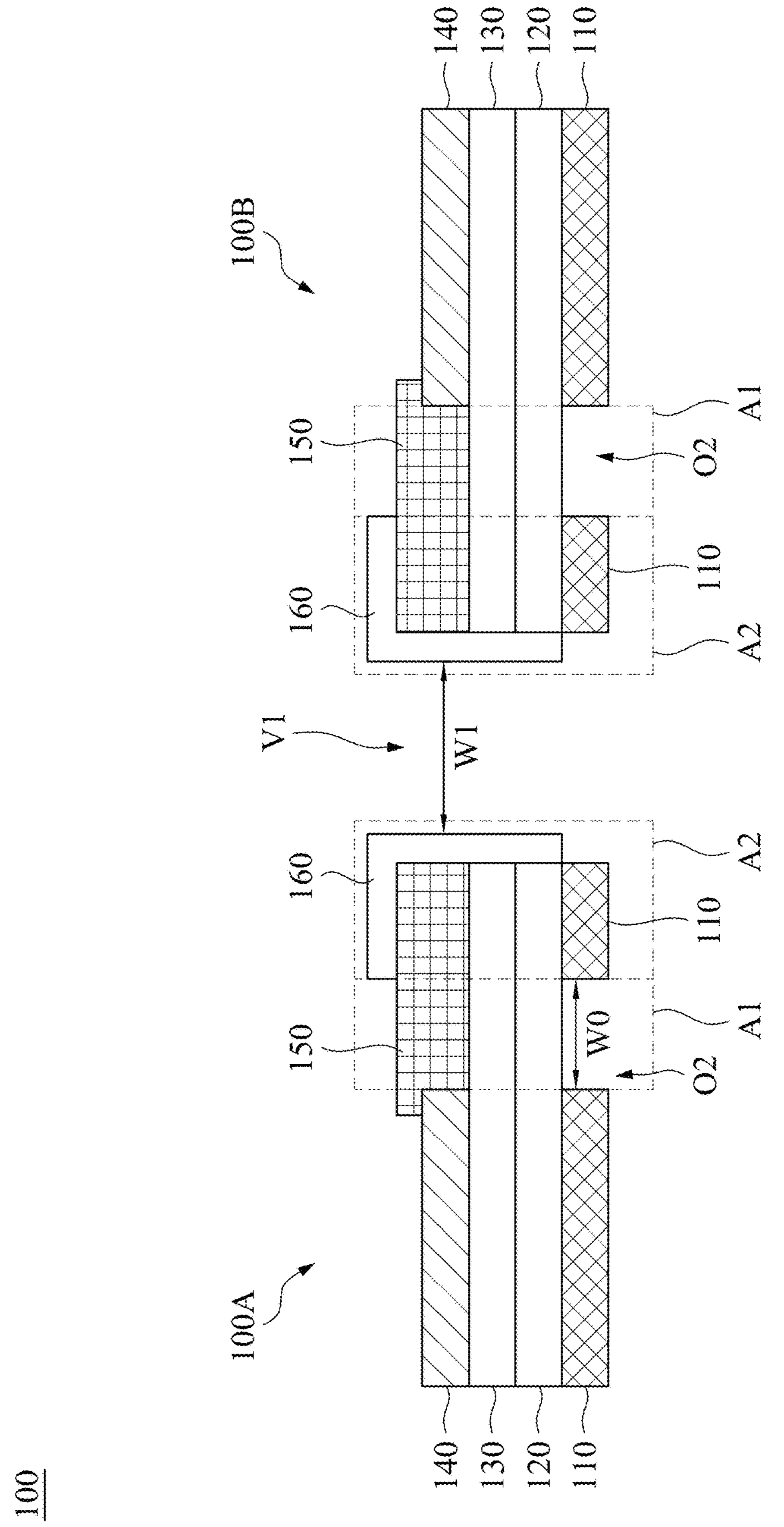
FIG. 2A illustrates a cross-sectional view of a thermistor stack according to some embodiments of the present invention.

Reference is made to FIG. 2A, which illustrates a cross-sectional view of a thermistor stack 100 according to some embodiments of the present invention. The thermistor stack 100 includes resistor subject 100A and resistor subject 1006. The resistor subject 100A and the resistor subject 100B include the base layer 110, the medium layer 120, the resistor layer 130, the metal layer 140, the nanometal layer 150 and the conductive layer 160, respectively.

In some embodiments, as shown in FIG. 2A, the medium layer is disposed over the base layer 110, the resistor layer is disposed over the medium layer 120, and the metal layer is disposed on the resistor layer 130, in which the metal layer 140 is not on a terminal portion of the resistor layer 130. Moreover, the nanometal layer 150 is disposed on a portion of the metal layer 140 and the terminal portion of the resistor layer 130. That is, the nanometal layer 150 contacts both the metal layer 140 and the resistor layer 130. The conductive layer 160 covers a portion of an upper surface of the nanometal layer 150 and extends to a sidewall of the nanometal layer 150 and a metal of the resistor layer 130. In some embodiments, the conductive layer 160 further extends to a portion or all of a sidewall of the medium layer 120.

In some embodiments, the material of the medium layer 120 is a material with high CTE (for example, CTE greater than 50 ppm/° C.). For example, the material can be used for the medium layer 120 includes polyethylene terephthalate (PET), polyethylene (PE), polyamide (PA), polycarbonate (PC), polyester, polypropylene (PP), polystyrene (PS), rigid polyurethane (PUR), polyvinyl chloride (PVC), polyvinylidene fluoride (PVDF), acrylonitrile butadiene styrene (ABS), cellulose acetate (CA), cellulose nitrate (CN), chlorinated polyvinylchloride (CPVC), ebonite, ethylene ethyl acrylate (EEA), ethylene vinyl acetate (EVA), fluoroethylene propylene (FEP), phenolic resin, combination thereof, and etc.

Compared to the conventional restriction of using the resistor material with high TCR, the material of resistor layer 130 of the present invention has no specific restriction. The material with high sheet resistance is preferred to be used, thereby acceptably decreasing the area of the resistor region. In some embodiments, the resistor layer 130 includes NiP, $LaB_6$, TaN, NiCr or other suitable materials.

In some embodiments, the material of the base layer 110 is the material with low CTE, so region of disposing the base layer 110 may not prone to expand and contract with temperature variation. As shown in FIG. 2A, the base layer 110 has the gap O2. In some embodiments, the gap O2 is directly below the nanometal layer 150, and the gap O2 may be partially or not below the conductive layer 160. In other words, the gap may be partially overlapped or totally not overlapped with the conductive layer 160.

The gap O2 is disposed to make stretching region A1 therein have better ability of expansion and contraction. When the stretching region A1 expanses with temperature (e.g. increasing temperature), respective connecting region A2 of the resistor subject 100A and the resistor subject 100B may extend toward each other, respectively. Both connecting regions A2 may contact and electrically connect while specific temperature is reached, thereby decreasing resistance. In other words, the connecting regions A2 may separate or connect with temperature variation, thus causing change in resistance of the thermistor stack 100.

Material of the nanometal layer 150 is selected as nanometal with conductivity and ductility. As the resistor layer 130 has bad ductility, crack may occur with temperature variation; hence, the nanometal layer 150 with better extensibility may avoid crack occurred, and further avoid failure of the thermistor stack 100. In some embodiments, the material of the nanometal layer 150 is nanosilver because nanosilver not merely has great conductivity but good extensibility as well, and crack may not tend to occur after expansion and contraction.

Material of the conductive layer 160 should have great conductivity, such as copper. By disposing the conductive layer 160 on the sidewalls of various layers of the connecting region A2, it shows better electrically connecting effect when the connecting regions A2 of the resistor subject 100A and the resistor subject 100B contact. On the contrary, if the conductive layers 160 are not disposed, it's uncertain that stable electrical connection can be formed while the two connecting regions A2 contact.

Terminal portions of the resistor layers 130 of the resistor subject 100A and the resistor subject 100B surround the through-hole via V1. In various embodiments, the through-hole via V1 of each thermistor stack 100 has the same or different width W1. In some embodiments, the through-hole vias V1 of the thermistor stacks in the same level have different widths, while the through-hole vias V1 of the thermistor stacks in different levels have the same or different widths. With arrangement of various widths, the resistor subject 100A and the resistor subject 100B of each thermistor 100 may separate or connect at different temperature, thereby causing different resistance. Hence, the produced buried thermistor may have better thermal sensitivity.

For example, in some embodiments that the material of the medium layer is polyethylene (with CTE of 200 ppm/° C.), when width $W_o$ of the gap O2 of the base layer 110 is 2 mm, based on 25° C. (in which stretching length of the stretching region A1 is 0), the stretching region A1 may have length change of about 10 μm (which means rate of stretching length change is 0.50%), so if the two connecting regions A2 are electrically connected at 50° C., the width W1 of the through-hole via V1 may be set as 20 μm. Similarly, at about 75° C., about 100° C. and about 125° C., the stretching region A1 may have length change of about 20 μm, about 30 μm and about 40 μm, respectively; thus, if the two connecting regions A2 are electrically connected at 50° C., the width W1 of the through-hole via V1 may be set as 40 μm, 60 μm and 80 μm.

Figure 2B:
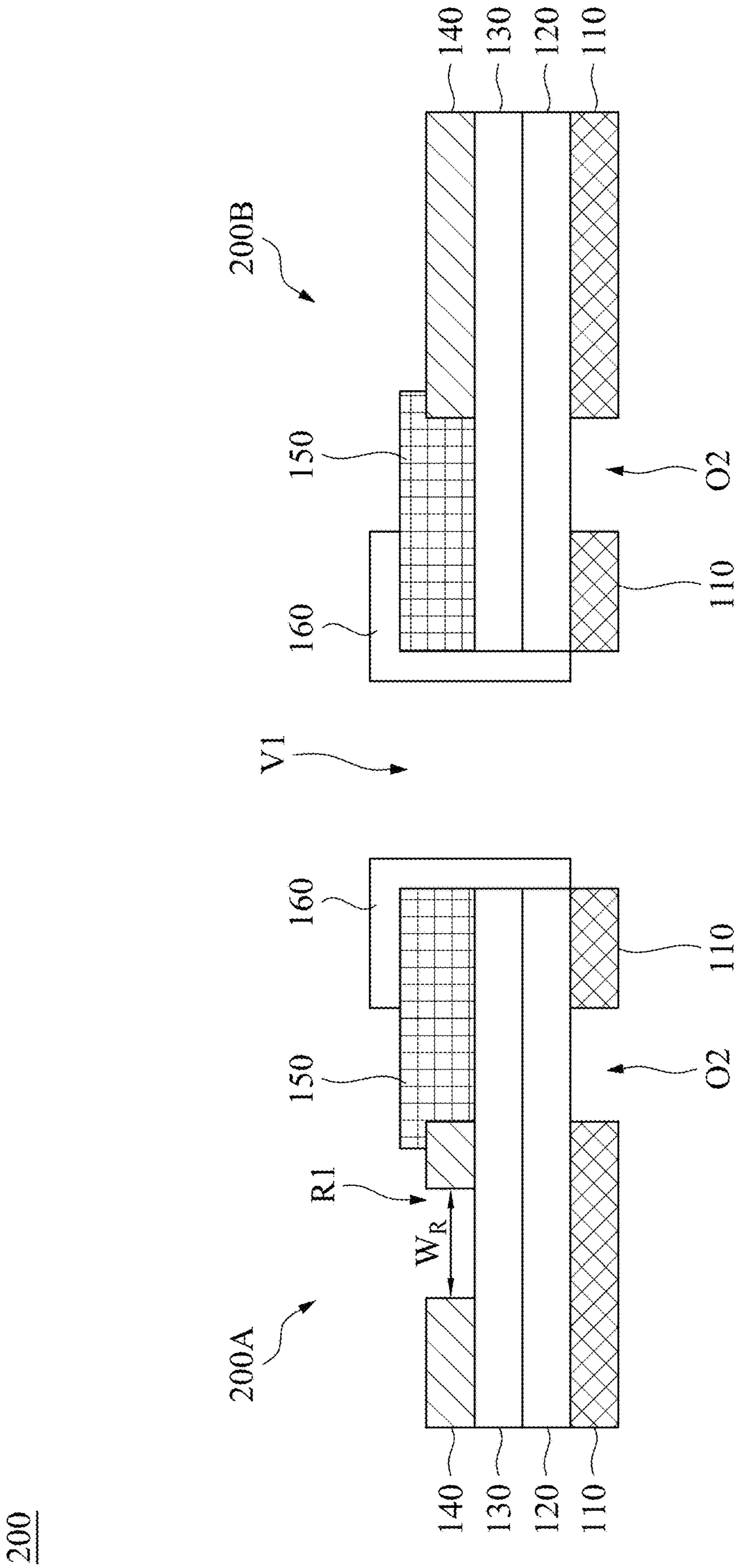
FIG. 2B illustrates a cross-sectional view of a thermistor stack according to other embodiments of the present invention.

Reference is made to FIG. 2B, which illustrates a cross-sectional view of a thermistor stack 200 according to other embodiments of the present invention. As described above, the through-hole via V1 separates the resistor subject 200A and the resistor subject 200B. Similarly, the resistor subject 200A and the resistor subject 200B respectively include the base layer 110, the medium layer 120, the resistor layer 130, the metal layer 140, the nanometal layer 150 and the conductive layer 160. As shown in FIG. 2B, the medium layer 120 is disposed on the base layer 110, the resistor layer 130 is disposed on the medium layer 120, and the metal layer 140 is disposed on the resistor layer 130, in which the metal layer 140 is not on the terminal portion of the resistor layer 130. The nanometal layer 150 is disposed on a portion of the metal layer 140 and the terminal portion of the resistor layer 130, and the conductive layer 160 covers the portion of the upper surface of the nanometal layer 150 and extends to the sidewall of the nanometal layer 150 and the sidewall of the resistor layer 130.

Difference between the thermistor stack 200 and the thermistor stack 100 is that the metal layer 140 of the resistor subject 200A includes recess R1, and the recess R1 is adjacent to the nanometal layer 150. In various embodiments, recess R1 may have the same or different width $W_R$. The width $W_R$ of the recess R1 may affect resistance, so different resistances may be designed for different levels of the circuit board, thereby increasing thermal sensitivity of the thermistor.

Figure 3A:
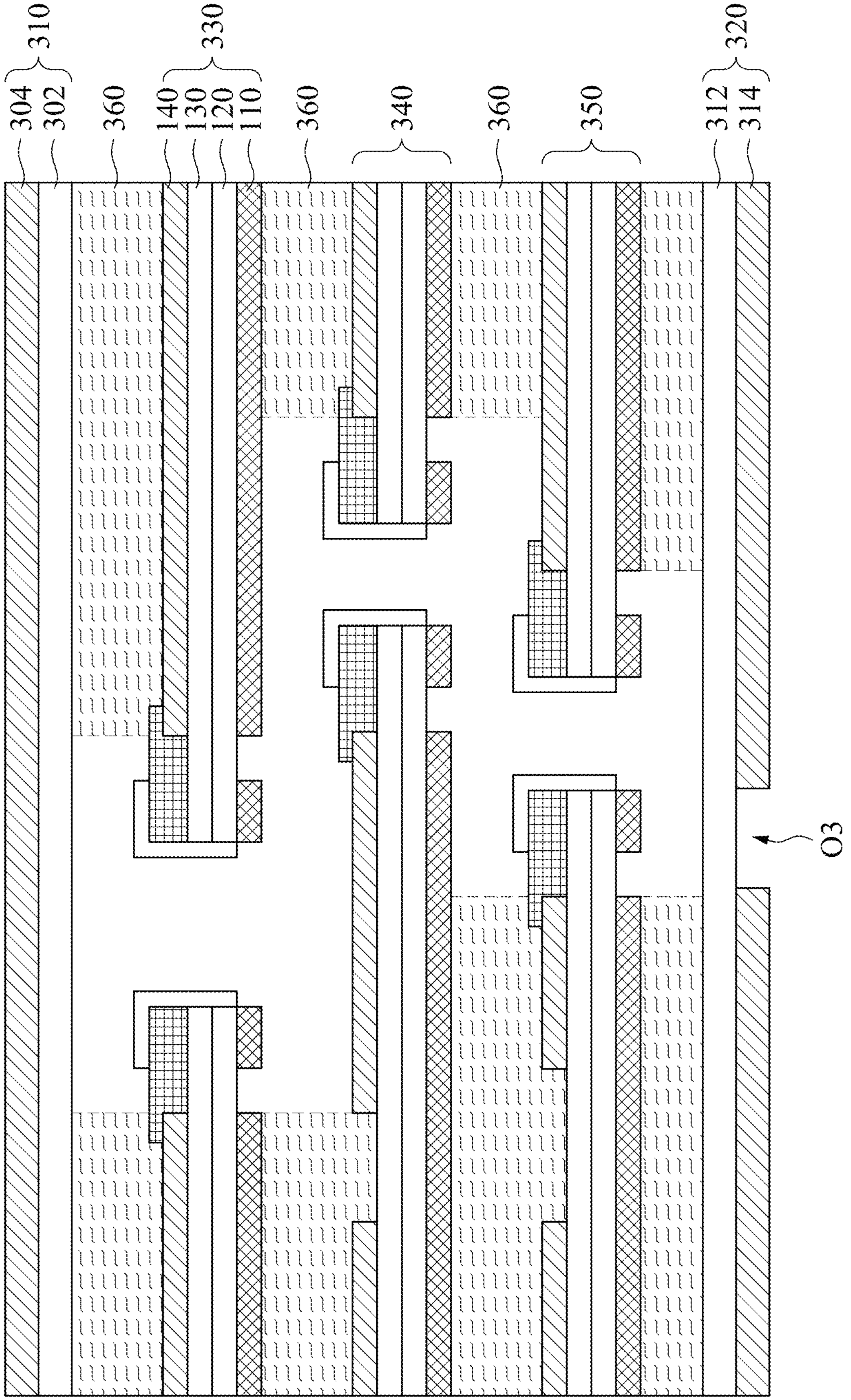
FIGS. 3A-3B illustrate cross-sectional views of intermediate stages in a method of fabricating a buried thermistor according to some embodiments of the present invention.
Figure 3B:
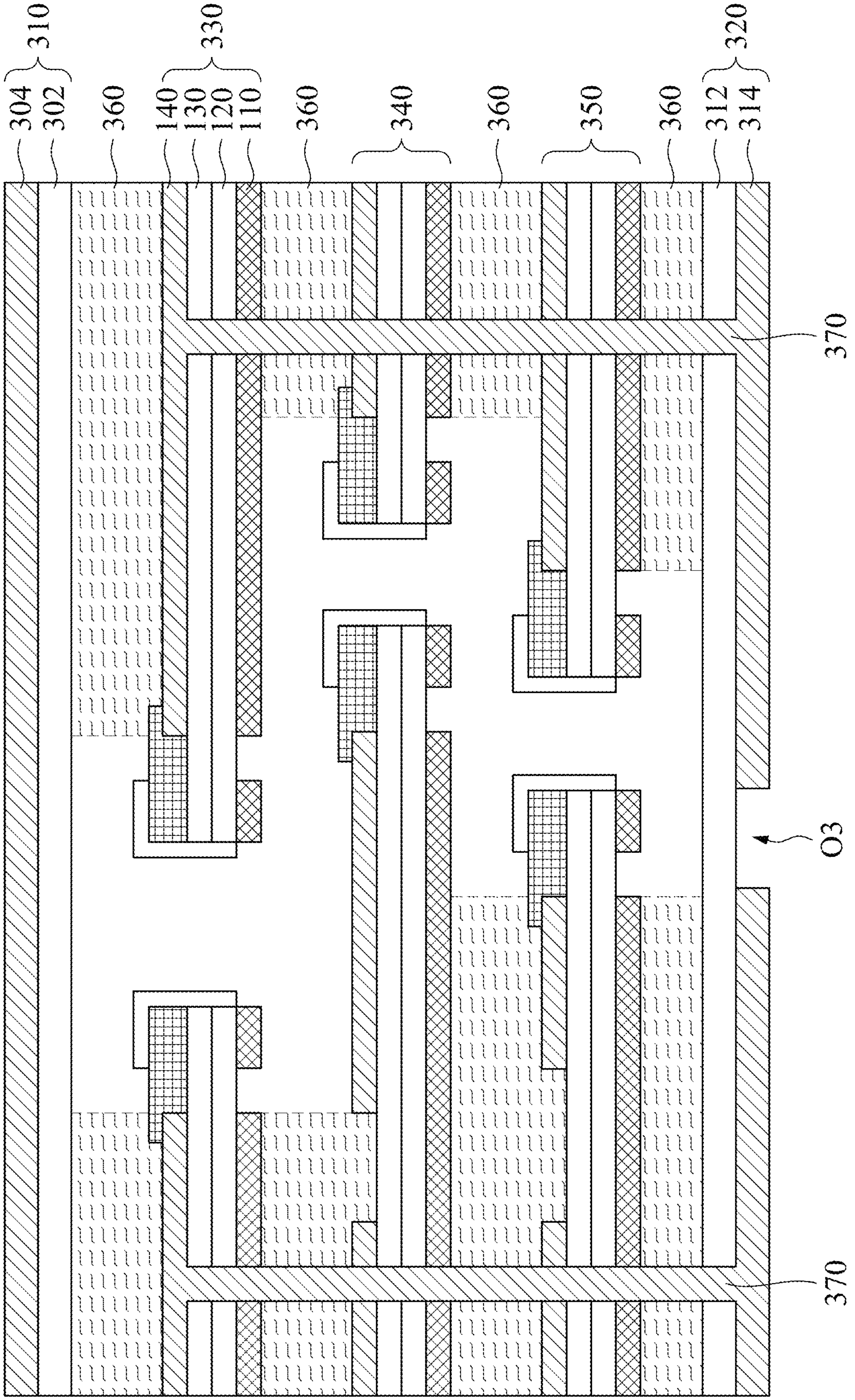

Reference is made to FIG. 3A and FIG. 3B, which illustrate cross-sectional views of intermediate stages in a method of fabricating a buried thermistor 300 according to some embodiments of the present invention. First, referring to FIG. 3A, the method of fabricating the buried thermistor 300 includes fabricating plural of the thermistor stack, such as the thermistor stack 100 or the thermistor stack 200. Next, an upper substrate 310 and a bottom substrate 320 are formed. In some embodiments, the upper substrate 310 includes a substrate layer 302 and a metal base layer 304, and the bottom layer 320 includes a substrate layer 312 and a metal base layer 314, in which a disconnection treatment should be performed to the metal base layer 314 of the bottom substrate 320, thereby forming an opening O3. Subsequently, an adhesive layer 360 is used to bind the upper substrate 310, the bottom substrate 320, the thermistor stack layer 330, the thermistor stack layer 340 and the thermistor stack layer 350. It is appreciated that FIG. 3A illustrates the buried thermistor 300 includes three thermistor stack layer, but the present invention is not limited to it; and number of the thermistor stack layers may be modified according to requirement.

Then referring to FIG. 3B, conductive metals 370 electrically connect the thermistor stack layer 330, the thermistor stack layer 340, the thermistor stack layer 350 and the bottom substrate 320. In more detail, the conductive metals 370 extend from the metal layer 140 of the uppermost thermistor stack layer 330 toward the metal base layer 314 of the bottom substrate 320, thereby conducting the thermistor stack layer 330, the thermistor stack layer 340, the thermistor stack layer 350 and the bottom substrate 320.

Figure 4:
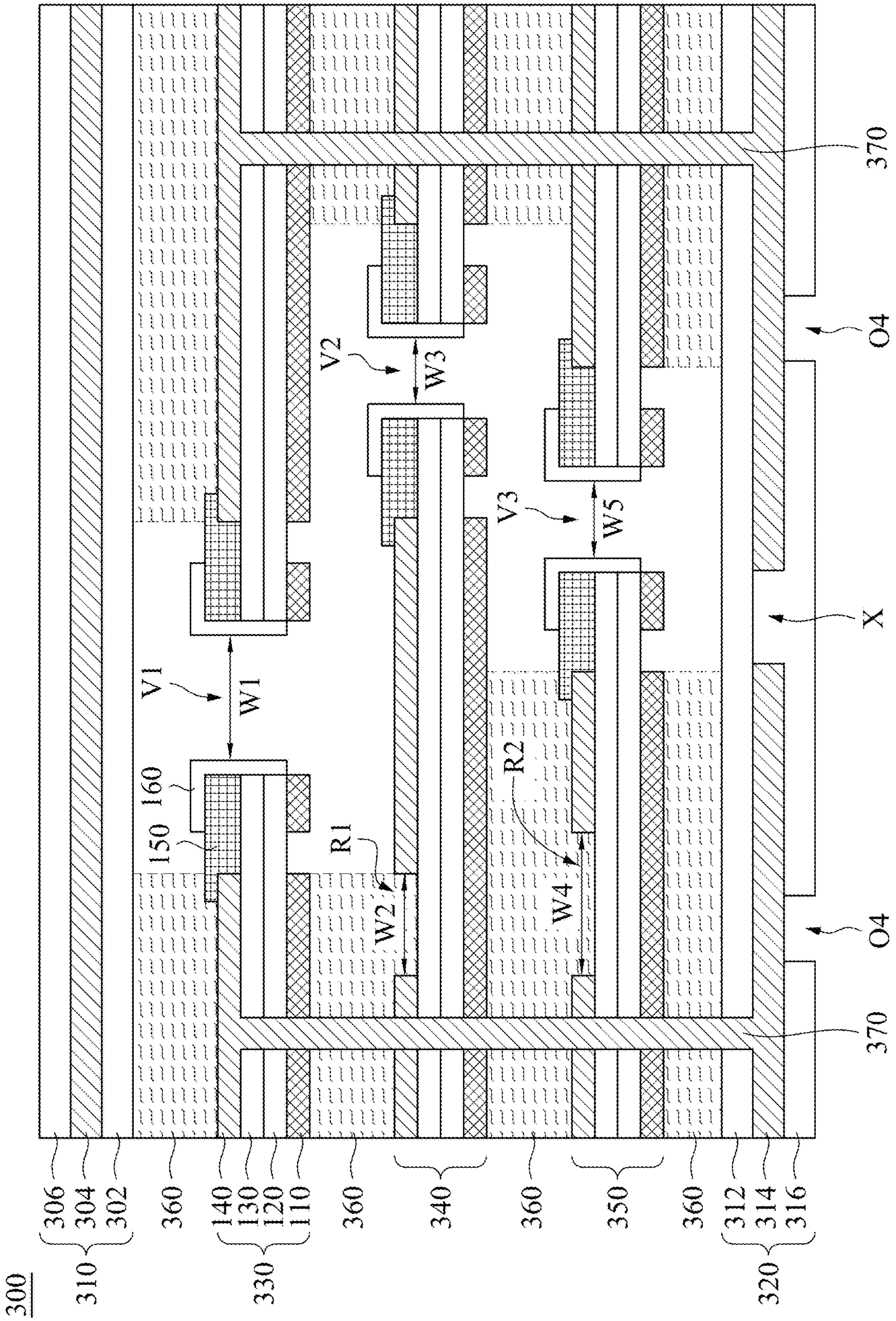
FIG. 4 illustrates a cross-sectional view of a buried thermistor according to some embodiments of the present invention.

Then, reference is made to FIG. 4, which illustrates a cross-sectional view of a buried thermistor according to some embodiments of the present invention. A cover film 306 and a cover film 316 are laminated on the upper substrate 310 and the bottom substrate 320 of the structure shown in FIG. 3B. In some embodiments, materials of the cover film 306 and the cover film 316 may be ink or other suitable material. To this extent, the structure of the buried thermistor 300 of some embodiments of the present invention is completed basically.

As shown in FIG. 4, the buried thermistor 300 includes the upper substrate 310, the bottom substrate 320, the thermistor stack layer 330, the thermistor stack layer 340 and the thermistor stack layer 350. The thermistor stack layer 330, the thermistor stack layer 340 and the thermistor stack layer 350 individually include the aforementioned the thermistor stack 100 or the thermistor stack 200. The upper substrate 310, the bottom substrate 320, the thermistor stack layer 330, the thermistor stack layer 340 and the thermistor stack layer 350 are bound between each other by the adhesive layer 360, in which the thermistor stack layer 330, the thermistor stack layer 340 and the thermistor stack layer 350 are disposed between the upper substrate 310 and the bottom substrate 320.

In some embodiments, the upper substrate 310 includes the substrate layer 302, the metal base layer 304 and the cover film 306, and the lower substrate 320 includes the substrate layer 312, the metal base layer 314 and the cover film 316. In some embodiments, material of the substrate layer 302 and the substrate layer 312 is similar to material of the aforementioned base layer 110, which is the material with low CTE. In some embodiments, the metal base layer 304 and the metal base layer 314 may be formed by, for example, copper clad laminate (CCL) or resin coated copper (RCC), or may include the similar material of the aforementioned metal layer 140.

Circuit fabrication is not performed to the metal base layer 304 and the metal base layer 314, and complete metal layers remain, thereby increasing thermal conductivity. Nevertheless, the metal base layer 314 of the bottom substrate 320 should be performed the disconnection treatment to form the aforementioned opening O3 (see FIG. 3A or FIG. 3B), also known as region X shown in FIG. 4. In some embodiments, the cover film 316 of the bottom substrate 320 includes at least one opening, while FIG. 4 illustrates the cover film 316 includes two openings O4. The opening O4 is disposed on two sides of the resistor to provide voltage. In some embodiments, two openings O4 are disposed at two ends of the region X.

In some embodiments, the buried thermistor 300 includes conductive metal 370, thereby conducting the thermistor stack layer 330, the thermistor stack layer 340, the thermistor stack layer 350 and the bottom substrate 320. The conductive metal 370 includes material with better electrical conductivity. In some embodiments, the material of the conductive metal 370 is the same as the metal of the metal layer 140, such as metal.

In some embodiments, the width W1 of the through-hole via V1 included by the thermistor stack layer 330, the width W3 of the through-hole via V2 included by the thermistor stack layer 340, and the width W5 of the through-hole via V3 included by the thermistor stack layer 350 are all different. In other embodiments, at least two of the width W1 of the through-hole via V1, the width W3 of the through-hole via V2 and the width W5 of the through-hole via V3 are the same. In some embodiments, the metal layer 140 of at least one of the thermistor stack layer 330, the thermistor stack layer 340 and the thermistor stack layer 350 includes recess. As shown in FIG. 4, the metal layer 140 of the thermistor stack layer 330 doesn't include recess, while the metal layers 140 of the thermistor stack layer 340 and the thermistor stack layer 350 include a recess R1 and a recess R2, respectively. In some embodiments, width W2 of the recess R1 and width W4 of the recess R2 are different, thereby having different resistance.

Figure 5:
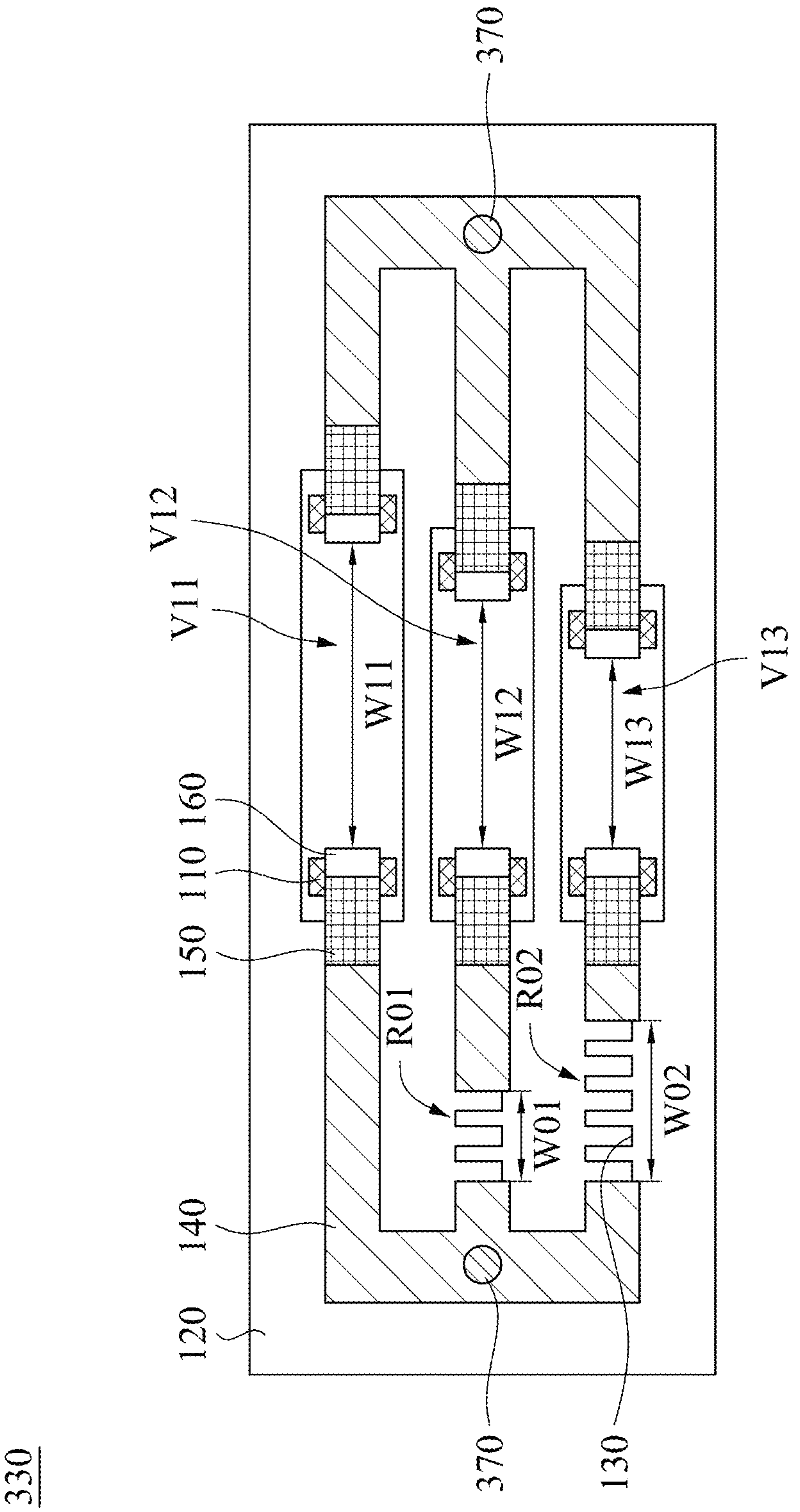
FIG. 5 illustrates a top view of a thermistor stack layer according to some embodiments of the present invention.

Reference is made to FIG. 5, which illustrates a top view of the thermistor stack layer 330 according to some embodiments of the present invention. The thermistor stack layer 330 includes three thermistor stacks, such as the thermistor stack 100 and/or the thermistor stack 200, connected in parallel. The three thermistor stacks include the through-hole via V11, the through-hole via V12 and the through-hole via V13. In some embodiments, the width W11 of the through-hole via V11, the width W12 of the through-hole via V12 and the width W13 of the through-hole via V13 are all different; thus individual thermistor stack may have different resistance at different temperature. The metal layer 140 of one of the three thermistor stacks does not include a recess, while the metal layers 140 of remaining two include the recess R01 and the recess R02, thereby exposing the resistor layer 130. In some embodiments, resistor circuit of the resistor layer 130 may be designed according to practical application, and snake-like circuit illustrated by FIG. 4 is merely an example. In some embodiments, the width W01 of the recess R01 and the width W02 of the recess R02 are different; thus the resistances of the three thermistor stacks are all different.

As described above, the present invention provides the buried thermistor and the method of fabricating the same. By designing the thermistor stacks with different resistances and using the medium layer with high CTE, various thermistor stacks may be electrically connected at different temperature conditions, thereby decreasing limitation to the material of the resistor layer and decreasing area of the resistor region. Further, the buried thermistor can have variable thermal sensitivity.

The following embodiments are provided to better elucidate the practice of the present invention and should not be interpreted in anyway as to limit the scope of same. Those skilled in the art will recognize that various modifications may be made while not departing from the spirit and scope of the invention. All publication and patent applications mentioned in the specification are indicative of the level of those skilled in the art to which this invention pertains.

What is claimed is:

1. A buried thermistor, comprising:

a lower substrate;

an upper substrate disposed above the lower substrate; and a plurality of thermistor stacks disposed between the upper substrate and the lower substrate, wherein each of the plurality of thermistor stacks comprises two resistor subjects, a through-hole via separates the two resistor subjects, and each of the resistor subjects comprises:

a base layer;

a medium layer disposed over the base layer;

a resistor layer disposed over the medium layer;

a metal layer disposed on the resistor layer;

a nanometal layer disposed on a portion of the metal layer and a terminal portion of the resistor layer, wherein the metal layer is not disposed on the terminal portion of the resistor layer; and a conductive layer, covering a portion of an upper surface of the nanometal layer and extending to a sidewall of the nanometal layer and a sidewall of the resistor layer, wherein the terminal portions of the resistor layers of the two resistor subjects surround the through-hole via.

2. The buried thermistor of claim 1, wherein the upper substrate and the lower substrate comprise a substrate layer, a metal base layer and a cover film, respectively.

3. The buried thermistor of claim 2, wherein the cover film of the lower substrate has at least an opening.

4. The buried thermistor of claim 1, wherein the conductive layer extends to a portion of a sidewall of the medium layer.

5. The buried thermistor of claim 1, further comprises:

a plurality of adhesive layer disposed between the upper substrate, the lower substrate and the plurality of thermistor stacks.

6. The buried thermistor of claim 1, wherein the metal layer of one of the resistor subjects of at least one of the plurality of thermistor stacks comprises a recess, and the recess is adjacent to the nanometal layer.

7. The buried thermistor of claim 1, further comprises:

a plurality of through-hole metal, connected the plurality of thermistor stacks and the lower substrate.

8. The buried thermistor of claim 1, wherein the through-hole vias of at least two of the plurality of thermistor stacks have different widths.

9. The buried thermistor of claim 1, wherein the through-hole vias of at least two of the plurality of thermistor stacks have the same widths.

10. The buried thermistor of claim 1, wherein the base layer has a gap, and the gap is located directly below the nanometal layer, but not completely below the conductive layer.

11. A method of fabricating a buried thermistor, comprises:

fabricating a plurality of thermistor stacks, comprises:

forming a stack layer, wherein the stack layer comprises a medium layer, a resistor layer and a metal layer, and the metal layer comprises a recess;

coating a nanometal layer within the recess and on a portion of the metal layer surrounding the recess;

forming a through-hole via in the nanometal layer, wherein the through-hole via extends through the nanometal layer and the stack layer, thereby separating the nanometal layer and the stack layer into a first portion and a second portion;

depositing two conductive layers, respectively, on a portion of a top surface of the nanometal layer of the first portion and the second portion, and extending on a sidewall of the first portion and a side wall of the second portion, respectively; and laminating a base layer on bottom of the first portion and the second portion, respectively;

fabricating an upper substrate and a lower substrate; and binding the upper substrate, the plurality of thermistor stacks and the lower substrate, wherein the plurality of thermistor stacks are located between the upper substrate and the lower substrate.

12. The method of claim 11, wherein forming the stack layer comprises:

forming a resistor layer over a medium layer;

forming a metal layer over the resistor layer; and forming the recess in the metal layer.

13. The method of claim 12, wherein forming the stack layer further comprises:

forming a laminating layer under the medium layer, wherein after depositing the two conductive layer, respectively, removing the laminating layer.

14. The method of claim 11, wherein after laminating the base layer, the method further comprises:

forming a gap within the base layer, and the gap is located directly below the nanometal layer.

15. The method of claim 11, further comprises:

forming an upper cover film on the upper substrate; and forming a lower cover film on the lower substrate, wherein a bottom of the lower cover film comprises two openings, and the two openings expose the lower substrate.

* * * * *